United States Patent
Abe et al.

(10) Patent No.: US 8,000,429 B2
(45) Date of Patent: Aug. 16, 2011

(54) JITTER CORRECTION METHOD AND CIRCUIT

(75) Inventors: Hideo Abe, Kawasaki (JP); Yuji Obana, Kawasaki (JP); Hideaki Mochizuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 920 days.

(21) Appl. No.: 11/520,609

(22) Filed: Sep. 14, 2006

(65) Prior Publication Data

US 2007/0253516 A1    Nov. 1, 2007

(30) Foreign Application Priority Data

Apr. 28, 2006 (JP) ................................. 2006-125258

(51) Int. Cl.
*H04L 7/00* (2006.01)
(52) U.S. Cl. ............................ 375/371; 370/516; 702/69
(58) Field of Classification Search .................. 375/371, 375/355; 370/516; 702/69
See application file for complete search history.

(56) References Cited

FOREIGN PATENT DOCUMENTS

| JP | 11-163951 | 6/1999 |
|----|-----------|--------|
| JP | 2003/218843 | 7/2003 |
| JP | 2003/304225 | 10/2003 |

*Primary Examiner* — Chieh M Fan
*Assistant Examiner* — Leila Malek
(74) *Attorney, Agent, or Firm* — Staas & Halsey LLP

(57) ABSTRACT

In a jitter correction method and circuit, combination data combined by adding, to referenced data, an end bit of data 1 clock prior to and a head bit of data 1 clock subsequent to the referenced data is sequentially generated. Each bit of the combination data is sequentially referred. When a change between a referenced bit and a bit directly adjoining the referenced bit is detected, and when a number of references reaches a multiplication number of the oversampling and a change between at least three adjoining bits including the referenced bit is not detected, change position display data regarding the directly adjoining bit as a change bit of the referenced data is generated and the number of references is initialized. When the change is not detected and the number of references does not reach the multiplication number, the number of references is incremented. All the change bits are extracted from the referenced data and the change position display data, and a data reproduction is performed corresponding to the multiplication number.

7 Claims, 13 Drawing Sheets

| DATA | DATA PATTERN PTN1 | | | | DATA PATTERN PTN2 | | | | DATA PATTERN PTN3 | | | | DATA PATTERN PTN4 | | | | DATA PATTERN PTN5 | | | | |
|---|---|---|---|---|---|---|---|---|---|---|---|---|---|---|---|---|---|---|---|---|---|
| DATA | a | b | c | d | e | f | g | h | i | j | k | l | m | n | o | p | q | r | s | t | ... |
| VALUE | 0 | 0 | 0 | 1 | 0 | 0 | 1 | 1 | 0 | 1 | 0 | 1 | 0 | 1 | 1 | 0 | 0 | 0 | 0 | 0 | ... |

JITTER CORRECTION METHOD AND CIRCUIT

BACKGROUND OF THE INVENTION

1. Field of the Invention

The present invention relates to a jitter correction method and circuit, and in particular to a jitter correction method and circuit correcting a shift of input data which occurs under the influence of jitters or the like.

2. Description of the Related Art

As a jitter correction technology mentioned above, the following prior art examples (1) and (2) have been known.

PRIOR ART EXAMPLE (1)

FIGS. 12A and 13

An optical transmission device 1 shown in FIG. 12A is composed of an optical/electrical conversion module (O/E) 10 converting an optical signal OD into an electrical signal (serial data SD), a serializer/deserializer 20 reproducing a clock CLK and data (parallel data (P)) from the serial data SD, and an integrated circuit 30 including a processing circuit 31 processing the parallel data (P) based on the clock CLK.

The serial data SD outputted from the optical/electrical conversion module (O/E) 10 occasionally includes fluctuations, i.e. jitters between data "a"-"i" as shown by marks "X" in FIG. 13, under the influence of the propagated distance of the optical signal OD (when the distance is long) or the like.

Therefore, a PLL (Phase Locked Loop) circuit and a data recovery circuit with high jitter absorbency are mounted on the serializer/deserializer 20, so that the clock CLK and the parallel data (P) are reproduced.

Thus, it is made possible to provide the processing circuit 31 within the integrated circuit 30 with the parallel data (P) without jitter, thereby making the processing circuit 31 normally execute processing (see e.g. patent document 1).

However, in this prior art example (1), it is necessary to mount the serializer/deserializer with high jitter absorbency, which disadvantageously requires a large mounting area on a device platform and increases power consumption of the overall device. Also, the use of such a high-performance serializer/deserializer that is expensive would lead to an increase of a device development cost.

Therefore, the following prior art example (2) not using the serializer/deserializer has been proposed.

PRIOR ART EXAMPLE (2)

FIGS. 12B and 13

The optical transmission device 1 shown in FIG. 12B does not use the serializer/deserializer 20 described in the above-mentioned prior art example (1), but is arranged so that the integrated circuit 30 may include a clock/data recovery circuit 40 and a jitter correction circuit 50 sequentially connected in series between the optical/electrical conversion module (O/E) 10 and the processing circuit 31, and an oversampling clock REF_CLK may be provided to the clock/data recovery circuit 40.

In operation, the clock/data recovery circuit 40 reproduces, from the serial data SD, oversampling data (A) and a clock CLK corresponding thereto based on the oversampling clock REF_CLK.

For example, the clock/data recovery circuit 40 samples the data "a"-"i" with the oversampling clock REF_CLK (about 622 Mbps) which is four times (multiplication number="4") the transmission rate (about 155 Mbps) of the serial data SD, as shown in FIG. 13, and outputs the oversampling data (A) in the form of paralleled data of the data "a"-"i" (8 bits in the example of FIG. 13), as well as the clock CLK (about 78 Mbps) corresponding thereto (see e.g. patent document 2). Since sampling is performed at four times the transmission rate in this example, four data can be basically obtained for each data "a"-"i".

However, the clock/data recovery circuit 40 has low jitter absorbency. Therefore, jitters JT may be included in the oversampling data (A) as shown in FIG. 13. For example, there are some cases where an extra bit is sampled like the data "b", and 1 bit less is sampled like data "e" and "g". These influences on other data cause a shift of data. Namely, if the processing is performed on the assumption that four data can be obtained for each data, a malfunction due to jitters occurs.

Therefore, when transition point detecting signals for at least two sections indicate the same result within the transition point detecting signals of data obtained by performing comparison processing between predetermined bit sections of the oversampling data (A), the jitter correction circuit 50 estimates a transition point of the data based on the transition point detecting signals indicating the same result.

The jitter correction circuit 50 selects data corresponding to the transition point estimated from the oversampling data (A), and reproduces corrected data (I) having absorbed the jitters JT as shown in FIG. 13.

Thus, it is made possible to provide the processing circuit 31 within the integrated circuit 30 with the corrected data (I) without jitters, thereby making the processing circuit 31 normally execute the processing (see e.g. patent document 3).

[Patent document 1] Japanese Patent Application Laid-open No. 2003-304225
[Patent document 2] Japanese Patent Application Laid-open No. 11-163951
[Patent document 3] Japanese Patent Application Laid-open No. 2003-218843

In the above-mentioned prior art example (2), the jitter correction circuit estimates the transition point of data when the transition point detecting signals for at least two sections indicate the same result. Therefore, there has been a problem that when data with fewer transition points is inputted, the transition point can not be accurately estimated whereby all of the jitters can not be absorbed. For example, when serial data is inputted in the order of series of bits "0" and series of bits "1", the jitter correction circuit in the above-mentioned prior art example (2) can not detect the transition point from "0" to "1".

In order to avoid this problem, the above-mentioned patent document 3 has also proposed to take advantage of patterns (synchronous characters or the like including the pattern of "0101" or "1010") in which data transitions per bit. However, such synchronous characters are not always included in the data inputted. While the addition of such patterns for a jitter correction can be conceived, a pattern addition circuit and a pattern deletion circuit are required, which leads to a reduction of an effective transmission rate of user data.

SUMMARY OF THE INVENTION

It is accordingly an object of the present invention to provide a jitter correction method and circuit correcting a shift of data which occurs under the influence of jitters or the like, without depending on a pattern of input data.

[1] In order to achieve the above-mentioned object, a jitter correction method (or circuit) according to one aspect of the present invention comprises: a first step of (or means) sequentially generating combination data combined by adding, to referenced data within input data oversampled, an end bit of data 1 clock prior to and a head bit of data 1 clock subsequent to the referenced data and of outputting the referenced data and the combination data; a second step of (or means) sequentially referring to each bit of the combination data, of generating change position display data regarding a directly adjoining bit as a change bit of the referenced data, and of initializing a number of references when a change between a referenced bit and a bit directly adjoining the referenced bit is detected, and when the number of references reaches a multiplication number of the oversampling and a change between at least three adjoining bits including the referenced bit is not detected, and of incrementing the number of references when the change is not detected and the number of references does not reach the multiplication number; and a third step of (or means) extracting all the change bits from the referenced data and the change position display data, and of performing a data reproduction of the extracted change bits corresponding to the multiplication number.

Namely, in a jitter correction method (or circuit) according to one aspect of the present invention, the first step (or means) sequentially generates combination data combined by adding, to the same clock as that of referenced data, bits on clock boundaries with a previous and a subsequent clock.

This addition of bits on the clock boundaries to the combination data is for detecting a change bit between the bits across the clock at the second step (or means) described later.

While sequentially referring to each bit of the combination data, the second step (or means) detects the change bit by repeatedly counting the number of references as a number corresponding to a multiplication number of oversampling at every reference. Repeatedly counting the number of references as a number corresponding to the multiplication number is because the change bit repeatedly appears at a position separated by the multiplication number, when the referenced data does not include jitters.

Namely, when detecting a change between the referenced bit and the bit directly adjoining the referenced bit, the second step (or means) regards the directly adjoining bit as the change bit of the referenced data regardless of the number of references in the same way as the prior art example, generates change position display data for identifying that the position is the change bit, and initializes the number of references.

Also, even when no change is detected between the referenced bit and the directly adjoining bit, the second step (or means) regards the directly adjoining bit as the change bit of the referenced data when the number of references has reached the multiplication number. This is for attending to a case where the referenced data includes series of bits oversampled from different data indicating the same value so that the change bit between the bits respectively corresponding to the different data is detected.

However, in consideration of a case where the directly adjoining bit is a bit sampled beyond the multiplication number, and where the change bit is shifted in the direction of a lower bit, the second step (or means) regards the directly adjoining bit as the change bit of the referenced data only when no change is detected among the referenced bit, the directly adjoining bit, and the further adjoining bit, generates the change position display data, and initializes the number of references in the same way as the above.

Thus, the change position display data identifying all of the change bits for the referenced data is generated.

The third step (or means) identifies the positions of the change bits from the change position display data to extract all of the corresponding change bits from the referenced data, and performs the data reproduction to the extracted change bits corresponding to the multiplication number.

Thus, in the jitter correction method and device according to one aspect of the present invention, it is made possible to correct a shift of data which occurs under the influence of jitters or the like, without depending on the pattern of the input data.

[2] Also, in the above-mentioned [1], the first step (or means) may include a step of (or means) providing the data 1 clock prior to the referenced data to the third step (or means), the jitter correction method may further comprise a fourth step of (or means) generating a bit selection signal in which the change position display data generated at the second step (or means) is sequentially bit-shifted in a direction of a lower bit by a predetermined bit number to be provided to the third step (or means), and the third step (or means) may extract all the change bits corresponding to the bit selection signal from the data 1 clock prior to the referenced data for the data reproduction.

Namely, the first step (or means) provides to the third step (or means) not the referenced data but data 1 clock prior to the referenced data. This is because a bit selection signal generated at the fourth step (or means) which will be described later is delayed by 1 clock from the clock corresponding to the referenced data (namely, at the same clock as that of the data 1 clock prior to the referenced data) to be outputted.

The fourth step (or means) generates the bit selection signal that is the change position display data generated at the second step (or means) sequentially bit-shifted in a direction of a lower bit (namely, in a direction of leaving from the change bit) by a predetermined bit number, so that the signal is provided to the third step (or means).

The third step (or means) extracts all of the change bits corresponding to the bit selection signal from the data 1 clock prior to the referenced data, so that the data reproduction is performed.

Thus, it is made possible to perform the data reproduction by using bits with less influence of jitters than the detected change bit.

[3] Also, in the above-mentioned [1], the third step (or means) may include a step of (or means) sequentially storing the extracted change bits in a buffer, and of sequentially reading from the buffer the change bits stored by a bit number required for the data reproduction.

For example, the number of extracted change bits depends on a case where the referenced data includes data sampled beyond the multiplication number under the influence of jitters or a case where data includes data sampled below the multiplication number.

Therefore, the third step (or means) sequentially stores the change bits extracted in a buffer, and sequentially reads the change bits stored by bit number required for the data reproduction from the buffer.

Thus, the circuit can be simplified since it is unnecessary to perform the determination or branch processing caused by the difference of the number of extracted change bits per clock.

[4] Also, in the present invention, a change bit monitoring method (or circuit) itself is provided, which comprises: steps of (or means) sequentially referring to each bit of combination data combined by adding, to referenced data within input data oversampled, an end bit of data 1 clock prior to and a head bit of data 1 clock subsequent to the referenced data, generating change position display data regarding a directly adjoining bit as a change bit of the referenced data, and initializing a number of references when a change between a referenced bit and a bit directly adjoining the referenced bit is detected, and when the number of references reaches a multiplication number of the oversampling and a change between at least three adjoining bits including the referenced bit is not detected, and incrementing the number of references when the change is not detected and the number of references does not reach the multiplication number.

In these change bit monitoring method and circuit, as described in the above-mentioned [1], the detection of the change bit can be performed, without depending on the pattern of the input data and the influence of jitters.

According to the present invention, it is made possible to correct a shift of data which occurs under the influence of jitters or the like without depending on a pattern of input data, to mount a similar function as a serializer/deserializer in the integrated circuit without increasing a mounting area for the device platform to which the present invention is applied and power consumption for the overall device, and to reduce a device development cost.

Also, the present invention is arranged so that bits with less influence of jitters may be extracted as the change bits, thereby enabling jitter tolerance of the device to be more improved.

Furthermore, the circuit is simplified so as to be able to perform the data reproduction regardless of the difference of the number of extracted change bits under the influence of jitters. Therefore, the processing load on the device caused by the jitter correction processing can be reduced.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Embodiments [1] and [2] of the jitter correction method according to the present invention and the circuit using the jitter correction method will now be described referring to FIGS. 1, 2, 3, 4A, 4B, 5A, 5B, 6A, 6B, 7A, 7B, 8A, 8B, 9A, 9B, 10, and 11.

Embodiment [1]

FIGS. 1, 2, 3, 4A, 4B, 5A, 5B, 6A, 6B, 7A, 7B, 8A, 8B, 9A, and 9B

This embodiment [1] shows an example of a case where serial data SD inputted is sampled with an oversampling clock (about 622 Mbps), which is four times (multiplication number="4") as fast as the transmission rate (e.g. about 155 Mbps) of the serial data SD, and jitter correction processing is performed to the data as 8-bit parallel data to be outputted.

Accordingly, if the serial data inputted is "a, b, c, d", the data to be outputted assumes 8-bit parallel data of "a, a, a, a, b, b, b, b" at the first clock timing, and 8-bit parallel data of "c, c, c, c, d, d, d, d" at the subsequent clock timing.

Figure 1:
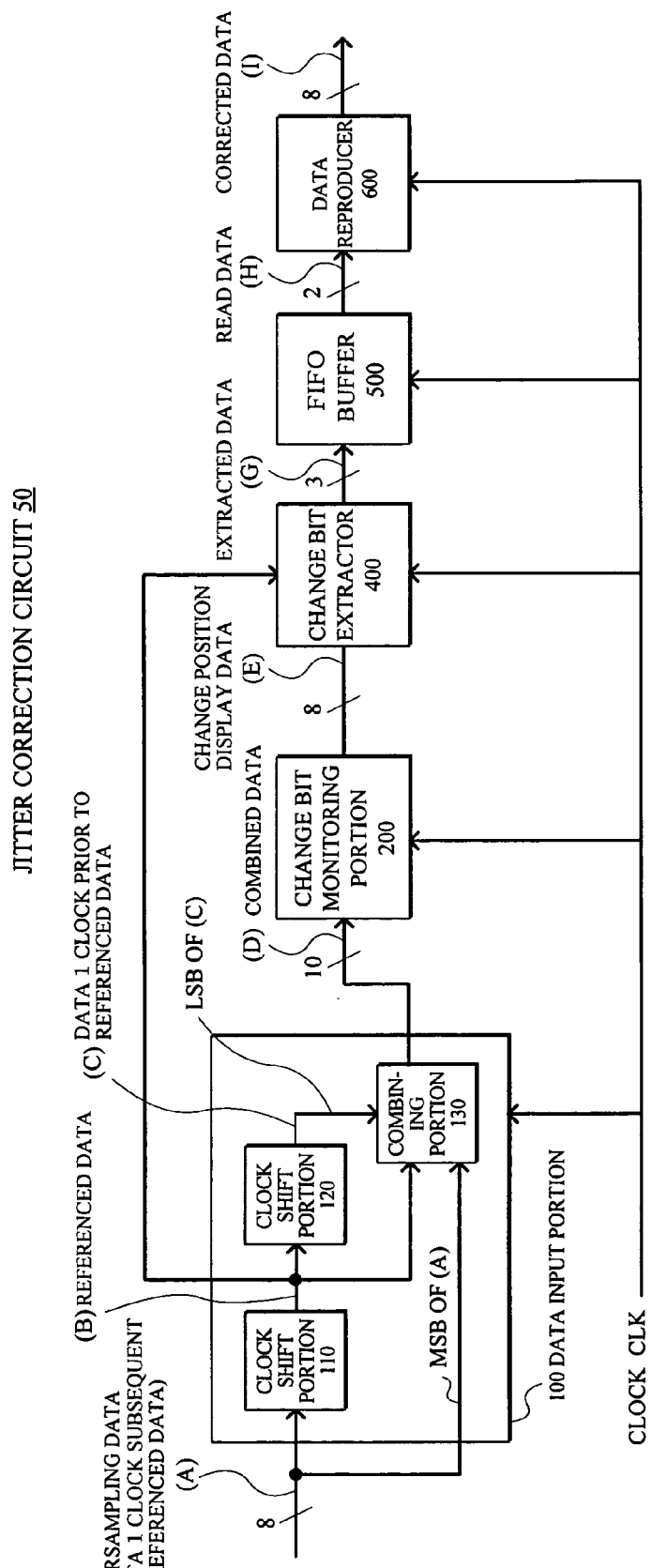
FIG. 1 is a block diagram showing an embodiment [1] of a jitter correction method and circuit according to the present invention.

[1]-1 Arrangement: FIG. 1

Oversampling data (A) that is inputted in the form of serial data and sampled with a sampling clock of four times as fast as the transmission rate of the serial data and that is made 8-bit parallel data is inputted to a jitter correction circuit 50 shown in FIG. 1.

This jitter correction circuit 50 is composed of clock shift portions 110 and 120 sequentially performing a clock shift to the oversampling data (A) and outputting referenced data (B) and data (C) 1 clock prior to the referenced data, a data input portion 100 including a combining portion 130 generating combination data (D) from an LSB (Least Significant Bit) of the data (C), the referenced data (B), and an MSB (Most Significant Bit) of the data (A), a change bit monitoring portion 200 detecting the change bit by sequentially referring to the bits of the combination data (D) to generate change position display data (E), a change bit extractor 400 extracting all of the change bits from the referenced data (B) and the change position display data (E) to sequentially store extracted data (G) in a FIFO buffer 500, and a data reproducer 600 sequentially reading the change bits for the required bit number from the FIFO buffer 500 and outputting corrected data (I) which is read data (H) reproduced corresponding to the multiplication number of the oversampling.

Also, a clock CLK corresponding to the oversampling data (A) is commonly supplied to the data input portion 100, the change bit monitoring portion 200, the change bit extractor 400, the FIFO buffer 500, and the data reproducer 600.

This clock CLK has a clock rate at the time when "k" bit parallel conversion is performed to the sampling clock, which is "n" times as fast as the transmission rate of the serial data inputted. Therefore, the clock rate assumes k/n times as fast as the transmission rate of the serial data inputted. Since an 8-bit parallel conversion with a quadruple sampling clock is performed in this embodiment, the clock CLK has a clock rate twice (8/4) as fast as the transmission rate of the serial data.

[1]-2 Operation Example

FIGS. 2, 3, 4A, 4B, 5A, 5B, 6A, 6B, 7A, 7B, 8A, 8B, 9A, AND 9B

Operation of this embodiment will now be described. Firstly, the overall operation will be described referring to FIG. 2. Then, operation examples of the change bit monitoring portion 200 and change bit monitoring examples (1)-(5) corresponding to various data patterns of serial data will be described referring to FIGS. 3, 4A, 4B, 5A, 5B, 6A, 6B, 7A, 7B, 8A, 8B, 9A, and 9B.

It is to be noted that while in the embodiments [1] and [2] which will be described later, the oversampling data (A) will be described as 8-bit parallel data after having performed quadruple oversampling to serial data "a"-"z", the following description can be similarly applied to data oversampled with a multiplication number other than 4.

Figure 2:
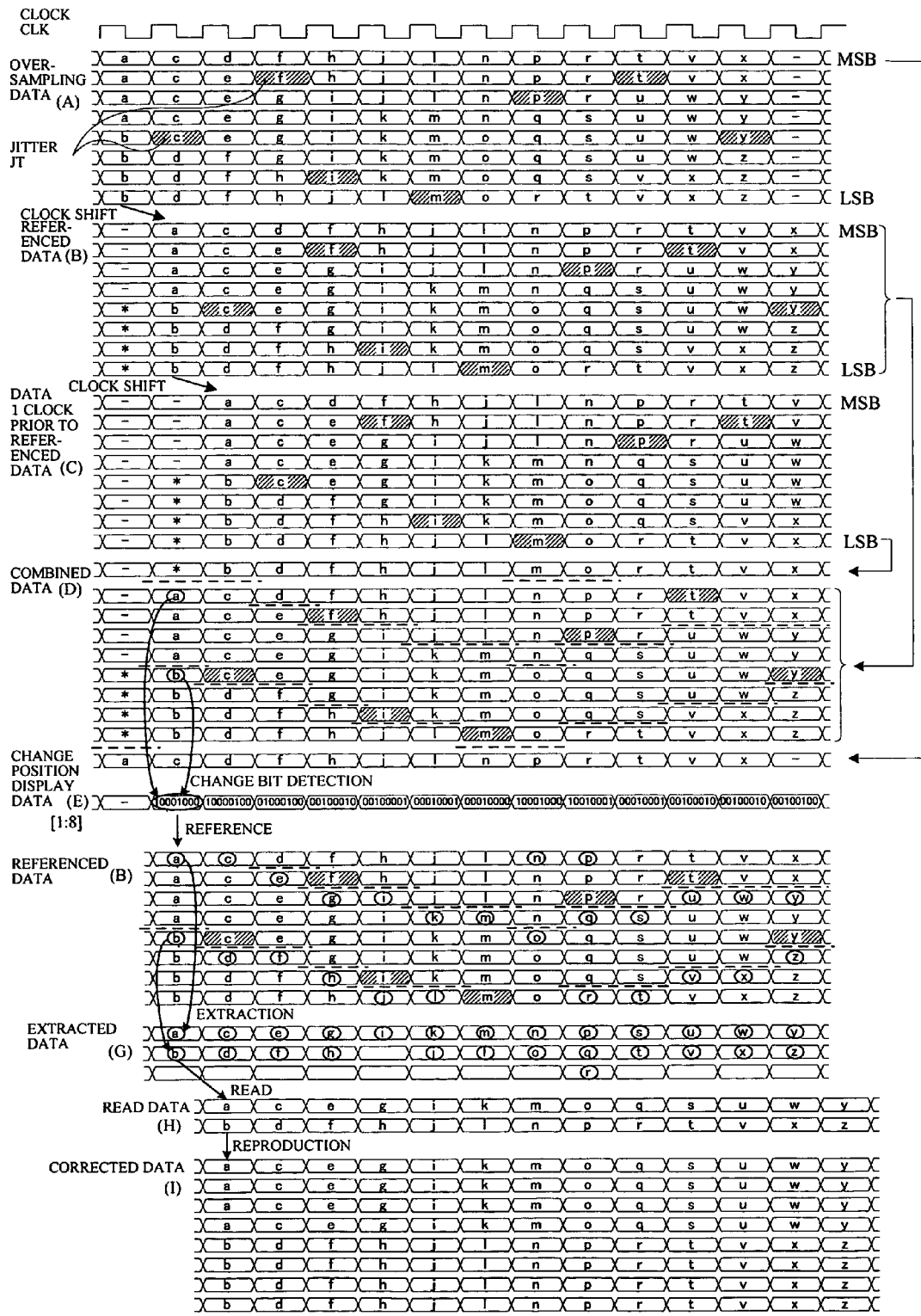
FIG. 2 is a time chart showing an overall operation example of an embodiment [1] of a jitter correction method and circuit according to the present invention.

Overall Operation: FIG. 2

FIG. 2 is a time chart showing an overall operation of the jitter correction circuit 50 in FIG. 1.

The oversampling data (A) include jitters JT as shown by hatching in FIG. 2. The jitters JT are results of e.g. data "c", "f", "i", and "m" sampled with one bit more than a multiplication number "4", and data "p", "t" and "y" sampled with one bit less than that. A shift occurs in other data under these influences. It is to be noted that the data "a"-"z" are respectively binary.

Every time the oversampling data (A) is received, the clock shift portion 110 within the data input portion 100 executes the clock shift, and generates the referenced data (B) to be provided to the clock shift portion 120, the combining portion 130, and the change bit extractor 400.

The clock shift portion 120 further executes the clock shift every time the referenced data (B) is received, and generates data (C) 1 clock prior to the referenced data (B) to provide the LSB to the combining portion 130.

The combining portion 130 having received the referenced data (B) and the LSB of the data (C) 1 clock prior to referenced data sequentially generates 10-bit parallel combination data (D) combined by adding the LSB of the data (C) 1 clock prior to the referenced data and the MSB of the oversampling data (A) (namely, the data 1 clock subsequent to the referenced data (B)) respectively to the referenced data (B) as the MSB and LSB, and provides the combination data (D) to the change bit monitoring portion 200.

The change bit monitoring portion 200 having received the combination data (D) executes change bit monitoring which will be described later, detects change bits, and generates change position display data (E) for the referenced data (B) to be provided to the change bit extractor 400.

As for the change position display data (E), as shown in e.g. FIG. 2, "1" indicating "changed" is set to the position of the change bit of the referenced data (B), and "0" indicating "unchanged" is set to the position which is not the change bit.

The change bit extractor 400 having received the referenced data (B) and the change position display data (E) extracts from the referenced data (B) all of the bits of the positions where "1" indicating "changed" is set, by referring to the change position display data (E), and stores the extracted data (G) in the FIFO buffer 500. For example, as shown, when the change position display data (E) for the referenced data (B) including the data "a" and "b" is set with "10001000", the change bit extractor 400 extracts the first bit data "a" and the fifth bit data "b" of the referenced data (B).

The data reproducer 600 reads required number of bits stored in the FIFO buffer 500 every time the clock CLK is supplied, and outputs to the subsequent stage corrected data (I) that is the read data (H) reproduced corresponding to the multiplication number of the oversampling. Since the 8-bit parallel data to which quadruple oversampling is performed is made input data in this embodiment, the data reproducer 600 reads per 2 bits from the FIFO buffer 500, and outputs the 8-bit parallel data that is the 2-bit data read and multiplied four times respectively, as the corrected data (I).

The operation example of the change bit monitoring portion 200 will now be described.

Figure 3:
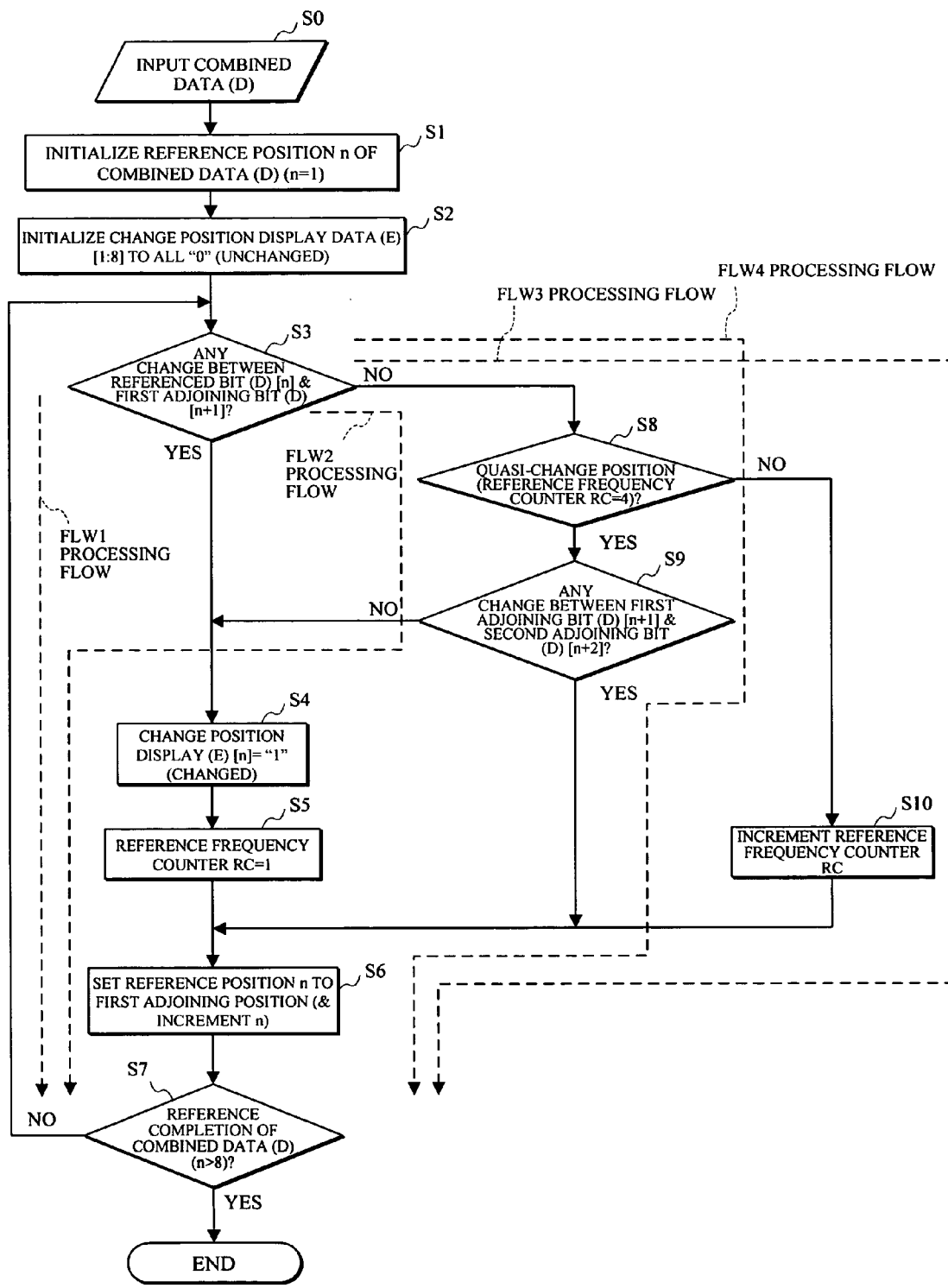
FIG. 3 is a flowchart showing an operation example of a change bit monitoring portion used for the present invention.

Operation Example of Change Bit Monitoring Portion 200: FIG. 3

FIG. 3 is a flowchart showing an operation of the change bit monitoring portion 200.

When the combination data (D) is inputted (at step S0), the change bit monitoring portion 200 sets a reference position "n" of the combination data (D) to a head bit (D)[1] (at step S1). Concurrently, the change bit monitoring portion 200 sets the change position display data (E)[1:8] with "00000000" indicating "entirely unchanged" (at step S2).

The change bit monitoring portion 200 sequentially refers to each bit of the combination data (D). According to the reference result of the combination data (D) and the count of a reference frequency counter RC which counts a reference frequency, any of the following processing flows FLW1-FLW4 (shown by dotted lines) is executed.

Processing Flow FLW1:

When a change is detected between a bit (D)[n] of the reference position "n" and a bit (D)[n+1] of the first adjoining position "n+1" directly adjoining the bit (D)[n] (at step S3), the change bit monitoring portion 200 regards the bit (D)[n+1] as the change bit of the referenced data (D), and sets "1" indicating "changed" to the change position display data (E)[n] (at step S4).

Concurrently, the change bit monitoring portion 200 initializes the reference frequency counter RC to "1" (at step S5).

The change bit monitoring portion 200 increments the reference position "n" by "1" in order to refer to the subsequent bit of the combination data (D), and sets the reference position "n" to the first adjoining position "n+1" (at step S6).

Since the oversampling data is 8-bit parallel data in this embodiment, the change bit monitoring portion 200 determines that the reference of the combination data (D) has been completed when the reference position "n" exceeds "8", so that the change bit monitoring portion 200 ends the change bit monitoring (at step S7).

It is to be noted that the completion of referring to the combination data (D) is determined when the reference position "n" exceeds "8" since the change bit monitoring portion 200 refers to each bit of the reference position "n", the first adjoining position "n+1", the second adjoining position "n+2" (namely, bits at the first adjoining position "9" and the second adjoining position "10" in case of reference position "n"="8") as shown in the following processing flow FLW2.

Processing Flow FLW2:

When no change is detected between the bit (D)[n] and the bit (D)[n+1] at the above-mentioned step S3, the change bit monitoring portion 200 determines whether or not the reference frequency counter RC has reached the multiplication number "4" (namely, each bit of the combination data (D) sequentially indicates the same value regardless of the presence/absence of jitters, and in a position regarded as the change bit (hereinafter, referred to as a "quasi-change position")(at step S8).

When the quasi-change position is found at the above-mentioned step S8, the change bit monitoring portion 200 further determines whether or not there is a change between the bit (D)[n+1] and the bit (D)[n+2] of the further adjoining (second adjoining) position n+2 (namely, whether or not the change bit is shifted in a direction of a lower bit under the influence of jitters (at step S9)).

When it is found that there is no change between the bit (D)[n+1] and the bit (D)[n+2] at the above-mentioned step S9, namely, that the change bit is not shifted in the direction of a lower bit, the bit (D)[n+1] is found to be the change bit. Therefore, the change bit monitoring portion 200 sets "1" indicating "changed" to the change position display data (E)[n] in the same way as the above-mentioned processing flow FLW1 (at step S4), and initializes the reference frequency counter RC to "1" (at step S5).

Processing Flow FLW3:

When no quasi-change position is found at the above-mentioned step S8, the change bit monitoring portion 200 determines that the change bit exists in the direction of further lower bit, and increments the reference frequency counter RC by "1" (at step S10).

Processing Flow FLW4:

When it is found that the change exists between the bit (D)[n+1] and the bit (D)[n+2] at the above-mentioned step S9, namely, the change bit is shifted in the direction of a lower bit, it is found that the bit (D)[n+2] is the change bit. Therefore, the change bit monitoring portion 200 performs no processing at this point (the processing flow FLW1 is executed by the following reference).

Figures 4A, 4B:
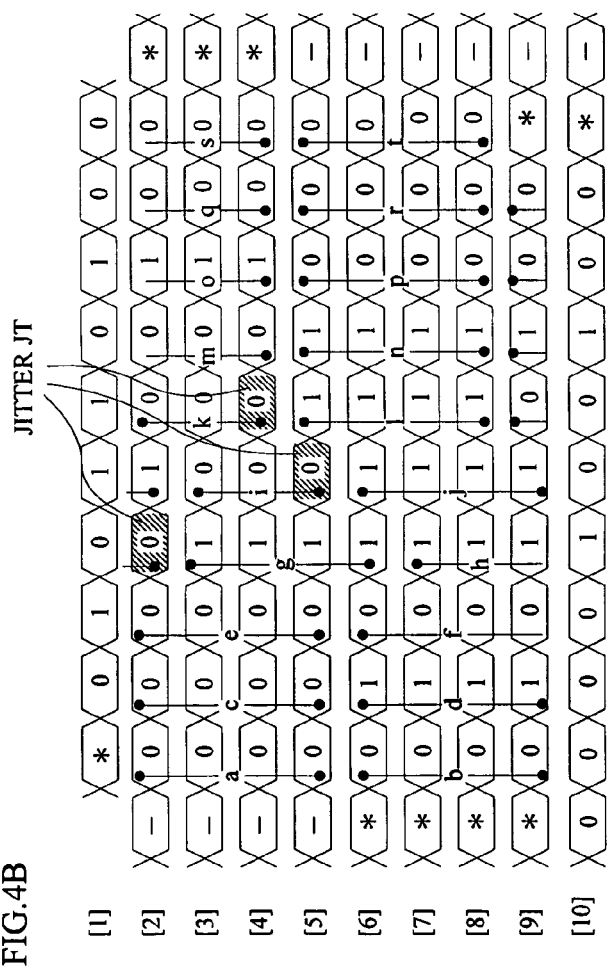
FIGS. 4A and 4B are diagrams showing an embodiment of serial data and combination data used for the present invention.

Data Pattern Example: FIGS. 4A and 4B

The change bit monitoring examples (1)-(5) respectively corresponding to data patterns PTN1-PTN5 of the serial data SD shown in FIG. 4A will now be described referring to FIGS. 5A, 5B, 6A, 6B, 7A, 7B, 8A, 8B, 9A, and 9B.

It is supposed that the oversampling data (A) is 8-bit parallel data of serial data SD to which quadruple oversampling is performed. Therefore, the data patterns PTN1-PTN5 indicate the oversampling data (A) respectively sampled as follows.

Data Pattern PTN1:

The data "a" and "b" sampled within the same clock and the data "c" sampled within the following clock are sequential bits indicating the same value ("0"), and only data "d" sampled within the same clock as the data "c" is a different value ("1").

Data Pattern PTN2:

There is a binary change ("0"→"1") between the data "f" and "g" sampled across the clocks, and data "e" and "f" as well as data "g" and "h" sampled within the same clock are sequential bits indicating respectively the same values ("0" and "1").

Data Pattern PTN3:

There are binary changes ("0"→"1" or "1"→"0") between the data "j" and "k" sampled across the clocks, and between the data "i" and "j" as well as "k" and "l" sampled within the same clock.

Data Pattern PTN4:

There are binary changes (respectively "0"→"1" and "1"→"0") between the data "m" and "n" as well as the data "o" and "p" sampled within the same clock, and data "n" and "o" sampled across the clocks are sequential bits indicating the same value ("1").

Data Pattern PTN5:

All of the data "q"-"t" sampled are sequential bits indicating the same value ("0").

It is to be noted that the above-mentioned data patterns PTN1-PTN5 completely cover all of the data transition patterns which can be inputted, including the data patterns encompassed by or substantially the same as the data patterns PTN1-PTN5 (data patterns in which only an order of a clock or data is exchanged but the characteristics indicated by the data pattern are not changed), and data patterns in which a bit inversion is performed to each value (the following description can be similarly applied to either case).

Also, the combination data (D) is generated, as shown in FIG. 4B, by adding, to the referenced data (i.e. bits (D)[2]-(D)[9]) obtained by performing clock shift to the oversampling data (A), the LSB (i.e. bit (D)[9] 1 clock prior to the referenced data) of the data 1 clock prior to the referenced data and the MSB (i.e. bit (D)[2] 1 clock subsequent to the referenced data) of the data 1 clock subsequent to the referenced data respectively as bits (D)[f] and (D)[10].

It is supposed that the oversampling data (A) includes jitters JT (state in which an extra bit is sampled from data "f" beyond the multiplication number "4", and 1 bit less is sampled from data "i" and "k") shown by hatching in FIG. 4B, and that shifts occur in other data under the influence of the jitters.

Figure 5A:
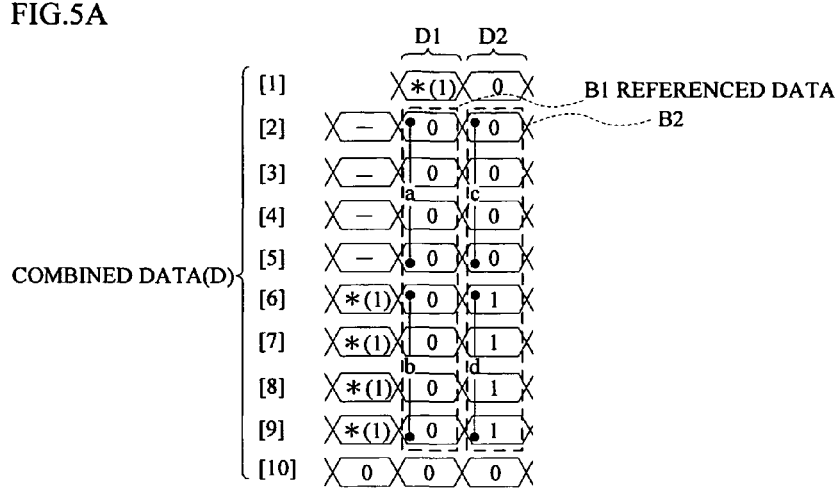
FIGS. 5A and 5B are diagrams showing a change bit monitoring example (1) of a change bit monitoring portion used for the present invention.
Figure 5B:
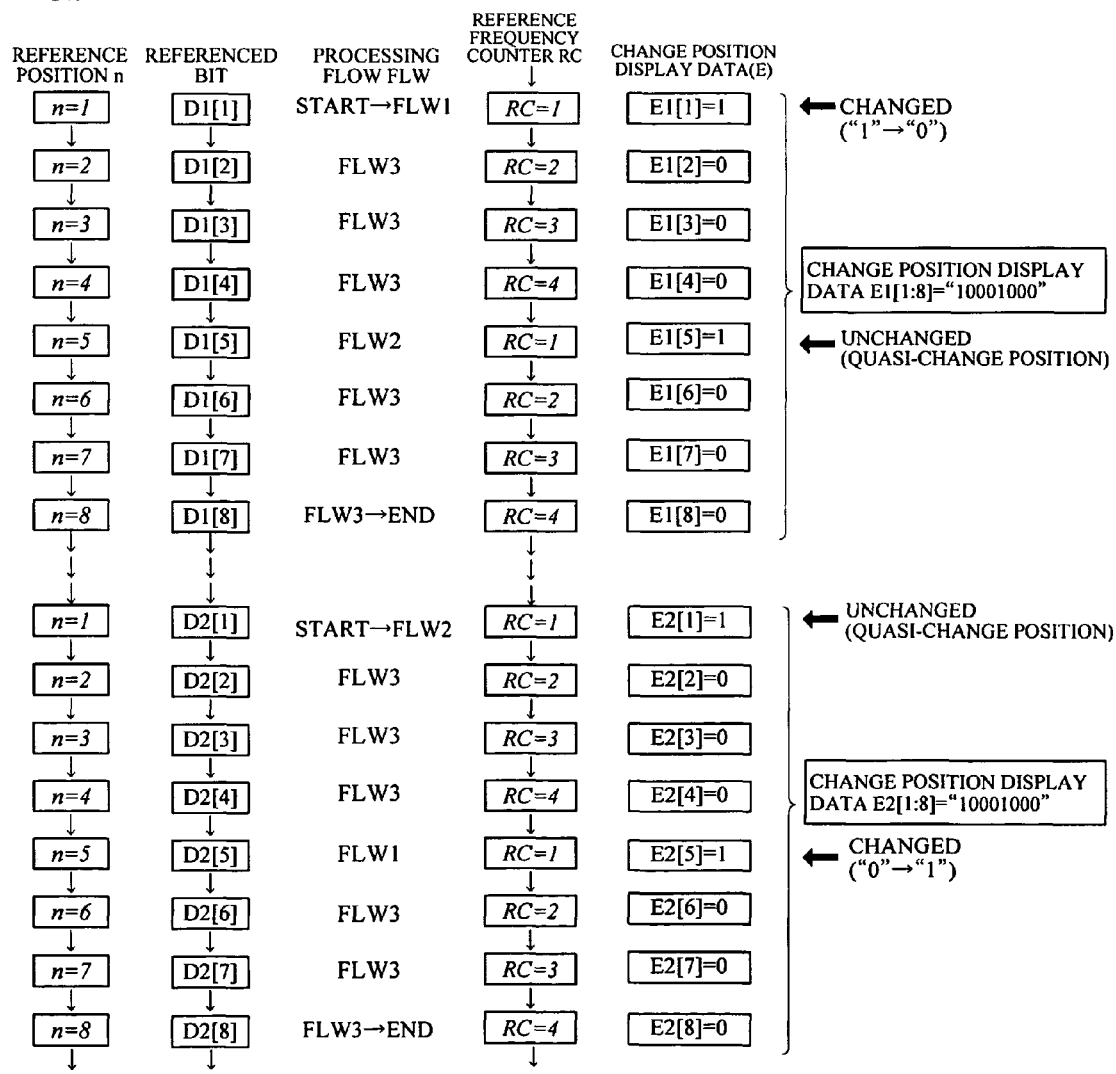

Change Bit Monitoring Example (1): FIGS. 5A and 5B

FIG. 5A shows an extracted part of combination data D1 and D2 concerning the data pattern PTN1 (data "a"-"d") where no jitter occurs within the combination data (D) shown in FIG. 4B. Also, the combination data D1 and D2 are respectively generated from the referenced data B1 and B2.

The change bit monitoring example for the combination data D1 and D2 will now be described referring to FIG. 5B. It is to be noted that for the sake of simplifying the description, the MSB of the combination data D1 (i.e. clock boundary bit "*" with data "a") is supposed to be "1".

When the combination data D1 is inputted, the change bit monitoring portion 200, as described with regard to FIG. 3, sets the reference position "n" (n=1) of the combination data D1 to the head bit D1[1], and concurrently initializes the change position display data E1[1:8] for the referenced data B1 to "00000000" (entirely unchanged) (at steps S1 and S2 of FIG. 3).

Since the change ("1"→"0") is detected between the bit D1[1] and the bit D1[2] directly adjoining the bit D1[1] in referring to the bit D1[1], the change bit monitoring portion 200 regards the bit D1[2] as the change bit of the referenced data B1 as described in the above-mentioned processing flow FLW1, sets "1" indicating "changed" to the change position display data E1[1], and initializes the reference frequency counter RC to "1".

Since no change is detected among the directly adjoining bits D1[3]-D1[5] and the reference frequency counter RC has not reached the multiplication number "4" in referring to the bits D1[2]-D1[4], the change bit monitoring portion 200 increments the reference frequency counter RC by "1" a total of three times as described in the above-mentioned processing flow FLW3. Thus, the count of the reference frequency counter RC assumes "4".

Although no change is detected between the bit D1[5] and the bit D1[6] directly adjoining the bit D1[5], the reference frequency counter RC has reached the multiplication number "4" and no change is detected between the bit D1[6] and the bit D1[7] directly adjoining the bit D1[6]. Therefore, the change bit monitoring portion 200 regards the bit D1[6] as the change bit of the referenced data B1 (quasi-change position), as described in the above-mentioned processing flow FLW2, sets "1" indicating "changed" to the change position display data E1[5], and initializes the reference frequency counter RC to "1".

In referring to the bits D1[6]-D1[8], the change bit monitoring portion 200 executes the processing flow FLW3. As a result, the count of the reference frequency counter RC assumes "4".

Thus, the change position display data E1 for the referenced data B1 is set with "10001000".

It is to be noted that in referring to the bit D1[8], since the directly adjoining bit D1[9] and the further adjoining bit D1[10] are also referred to, the change bit monitoring portion 200 does not execute the change bit monitoring for the bits D1[9] and [10] (i.e. reference position "n"="9" and "10"). This is similarly applied to the change bit monitoring for the following combination data D2 and the change bit monitoring examples (2)-(5) which will be described later.

When the combination data D2 is inputted, while no change is detected between the bit D2[1] and the bit D2[2] directly adjoining the bit D2[1] in referring to the bit D2[1], the reference frequency counter RC has reached the multiplication number "4" and no change is detected between the bit D2[2] and the further adjoining bit D2[3]. Therefore, the change bit monitoring portion 200 regards the bit D2[2] as the quasi-change position of referenced data B2, sets "1" indicating "changed" to the change position display data E2[1] for the referenced data B2, and initializes the reference frequency counter RC to "1".

In referring to the bits D2[2]-D2[4], the change bit monitoring portion 200 executes the processing flow FLW3. As a result, the count of the reference frequency counter RC assumes "4".

Since detecting the change ("0"→"1") between the bit D2[5] and the bit D2[6] directly adjoining the bit D2[5] in referring to the bit D2[5], the change bit monitoring portion 200 regards the bit D2[6] as the change bit of the referenced data B2, sets "1" indicating "changed" to the change position display data E2[5], and initializes the reference frequency counter RC to "1".

In referring to the bits D2[6]-D2[8], the change bit monitoring portion 200 executes the processing flow FLW3. As a result, the count of the reference frequency counter RC assumes "4".

Thus, the change position display data E2 for the referenced data B2 is set with "10001000".

Figure 6A:
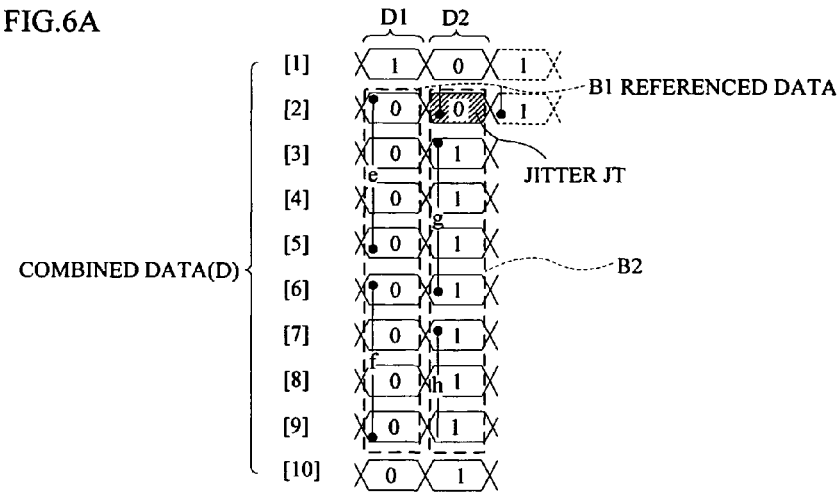
FIGS. 6A and 6B are diagrams showing a change bit monitoring example (2) of a change bit monitoring portion used for the present invention.
Figure 6B:
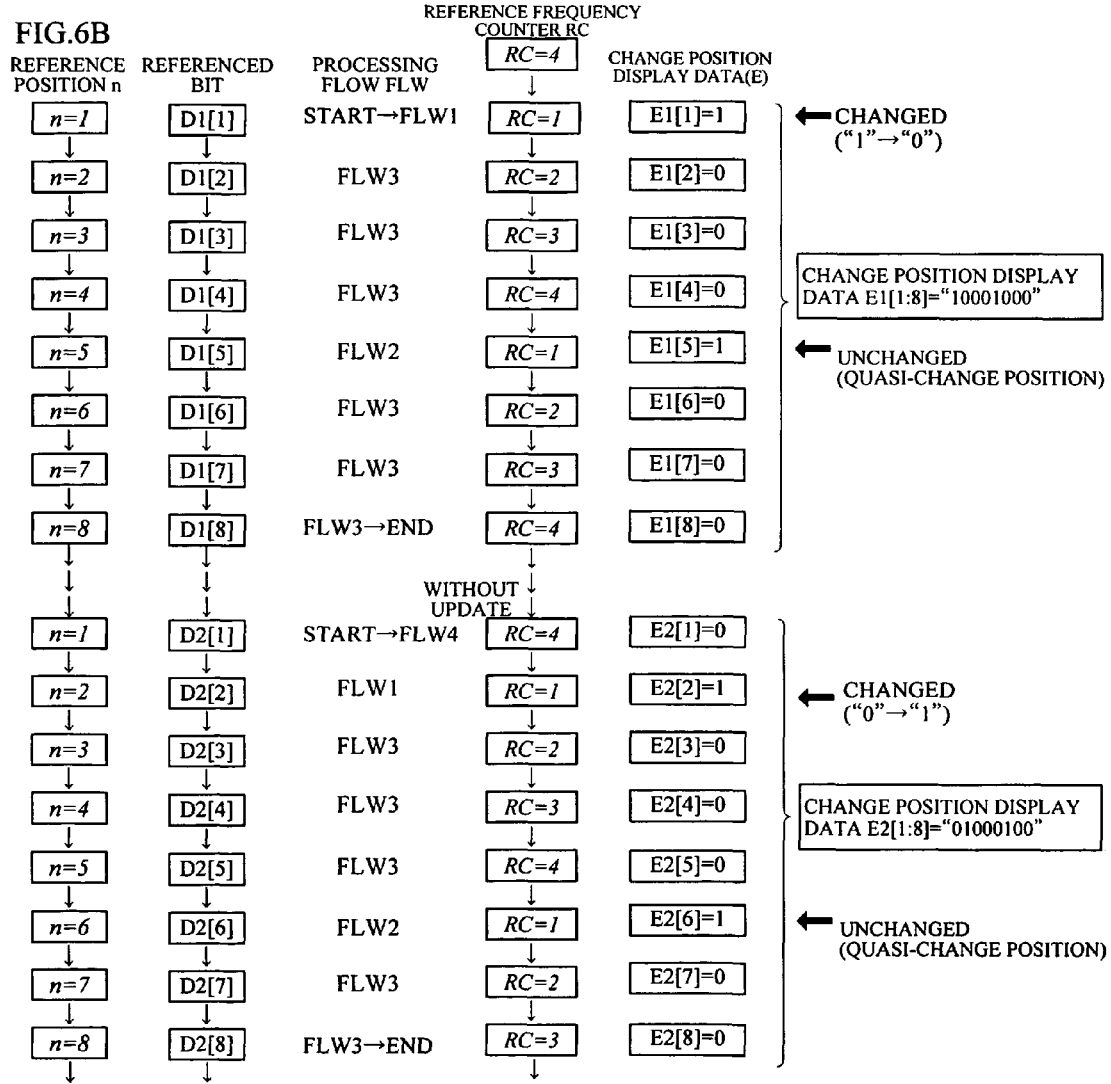

Change Bit Monitoring Example (2): FIGS. 6A and 6B

FIG. 6A shows an extracted part of combination data D1 and D2 concerning the data pattern PTN2 (data "e"-"h") where a jitter occurs in the data "f" and a shift occurs in the data "g" and "h" under the influence of the jitter, within the combination data (D) shown in FIG. 4B.

The change bit monitoring example for the combination data D1 and D2 will now be described referring to FIG. 6B. It is to be noted that the count of the reference frequency counter RC assumes "4" since the above-mentioned change bit monitoring (1) has been already executed.

When the combination data D1 is inputted, the change ("1"→"0") is detected between the bit D1[1] and the bit D1[2] directly adjoining the bit D1[1] as described in the above-mentioned processing flow FLW1. Therefore, the change bit monitoring portion 200 regards the bit D1[2] as the change bit of the referenced data B1, sets "1" indicating "changed" to the change position display data E1[1], and initializes the reference frequency counter RC to "1".

In referring to the bits D1[2]-D1[4], the change bit monitoring portion 200 executes the processing flow FLW3. As a result, the count of the reference frequency counter RC assumes "4".

While no change is detected between the bit D1[5] and the bit D1[6] directly adjoining the bit D1[5] in referring to the bit D1[5], the reference frequency counter RC has reached the multiplication number "4" and no change is detected between the bit D1[6] and further adjoining bit D1[7]. Therefore, the change bit monitoring portion 200 regards the bit D1[6] as the quasi-change position of the referenced data B1, as described in the above-mentioned processing flow FLW2, sets "1" indicating "changed" to the change position display data E1[5], and initializes the reference frequency counter RC to "1".

In referring to the bits D1[6]-D1[8], the change bit monitoring portion 200 executes the processing flow FLW3. As a result, the count of the reference frequency counter RC assumes "4".

Thus, the change position display data E1 for the referenced data B1 is set with "10001000".

Also, when the combination data D2 is inputted, while no change is detected between the bit D2[1] and the bit D2[2] directly adjoining the bit D2[1] in referring to the bit D2[1], the reference frequency counter RC has reached the multiplication number "4" and the change ("0"→"1") is detected between the bit D2[2] and the bit D2[3] further adjoining the bit D2[2]. Therefore, no processing is performed as described in the above-mentioned processing flow FLW4. As a result, the count of the reference frequency counter RC is not updated and keeps "4".

Since the change ("0"→"1") is detected between the bit D2[2] and the bit D2[3] directly adjoining the bit D2[2] in referring to the bit D2[2], the change bit monitoring portion 200 regards the bit D2[3] as the change bit of the referenced data B2 as described in the above-mentioned processing flow FLW1, sets "1" indicating "changed" in the change position display data E2[2], and initializes the reference frequency counter RC to "1".

In referring to the bits D2[3]-D2[5], the change bit monitoring portion 200 executes the processing flow FLW3. As a result, the count of the reference frequency counter RC assumes "4".

While no change is detected between the bit D2[6] and the bit D2[7] directly adjoining the bit D2[6] in referring to the bit D2[6], the reference frequency counter RC has reached the multiplication number "4" and no change is detected between the bit D2[7] and the bit D2[8] further adjoining the bit D2[7]. Therefore, the change bit monitoring portion 200 regards the bit D2[7] as the quasi-change position of the referenced data B2, sets "1" indicating "changed" to the change position display data E2[6], and initializes the reference frequency counter RC to "1".

In referring to the bits D2[7] and D2[8], the change bit monitoring portion 200 executes the above-mentioned processing flow FLW3. As a result, the count of the reference frequency counter RC assumes "3".

Thus, the change position display data E2 for the referenced data B2 is set with "01000100".

Figure 7A:
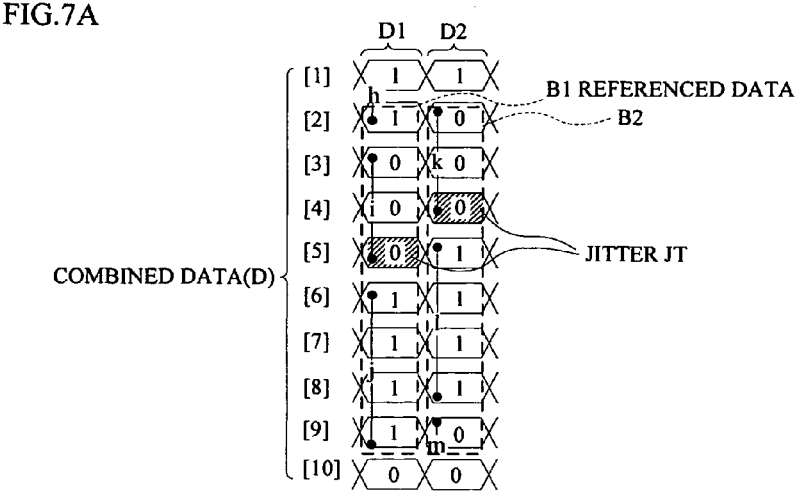
FIGS. 7A and 7B are diagrams showing a change bit monitoring example (3) of a change bit monitoring portion used for the present invention.
Figure 7B:
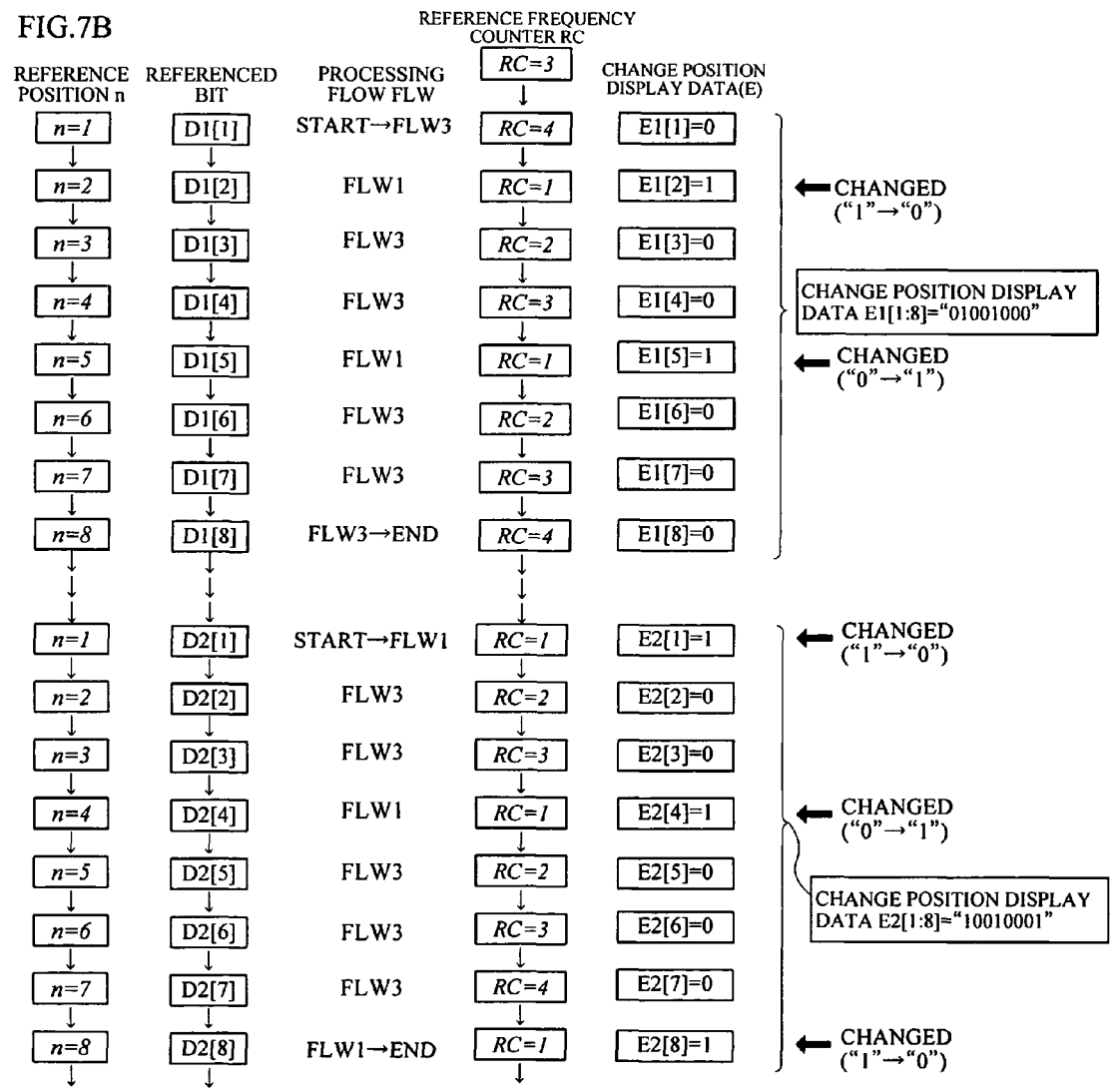

Changing Bit Monitoring Example (3): FIGS. 7A and 7B

FIG. 7A shows an extracted part of combination data D1 and D2 concerning the data pattern PTN3 (data "i"-"l") where jitters occur in the data "i" and "k", and a shift occurs in the data "l" under the influence of the jitters in the data "i" and "k" and the jitters shown in the above-mentioned change bit monitoring example (2) within the combination data (D) shown in FIG. 4B.

The change bit monitoring example for the combination data D1 and D2 will now be described referring to FIG. 7B. It is to be noted that the count of the reference frequency counter RC assumes "3" since the above-mentioned change bit monitoring (2) has been already executed.

When the combination data D1 is inputted, the change bit monitoring portion 200 executes the processing flow FLW3 in referring to the bit D1[1]. As a result, the count of the reference frequency counter RC assumes "4".

Since the change ("1"→"0") is detected between the bit D1[2] and the bit D1[3] directly adjoining the bit D1[2] in referring to the bit D1[2], the change bit monitoring portion 200 regards the bit D1[3] as the change bit of the referenced data B1 as described in the above-mentioned processing flow FLW1, sets "1" indicating "changed" in the change position display data E1[2], and initializes the reference frequency counter RC to "1".

In referring to the bits D1[3] and D1[4], the change bit monitoring portion 200 executes the processing flow FLW3. As a result, the count of the reference frequency counter RC assumes "3".

Since the change ("0"→"1") is detected between the bit D1[5] and the bit D1[6] directly adjoining the bit D1[5] in referring to the bit D1[5], the change bit monitoring portion 200 regards the bit D1[6] as the change bit of the referenced data B1, sets "1" indicating "changed" to the change position display data E1[5], and initializes the reference frequency counter RC to "1".

In referring to the bits D1[6]-D1[8], the change bit monitoring portion 200 executes the processing flow FLW3. As a result, the count of the reference frequency counter RC assumes "4".

Thus, the change position display data E1 for the referenced data B1 is set with "01001000".

When the combination data D2 is inputted, the change ("1"→"0") is detected between the bit D2[1] and the bit D2[2] directly adjoining the bit D2[1] in referring to the bit D2[1]. Therefore, the change bit monitoring portion 200 regards the bit D2[2] as the change bit of the referenced data B2, sets "1" indicating "changed" to the change position display data E2[1], and initializes the reference frequency counter RC to "1".

In referring to the bits D2[2] and D2[3], the change bit monitoring portion 200 executes the processing flow FLW3. As a result, the count of the reference frequency counter RC assumes "3".

Since the change ("0"→"1") is detected between the bit D2[4] and the bit D2[5] directly adjoining the bit D2[4] in referring to the bit D2[4], the change bit monitoring portion 200 regards the bit D2[5] as the change bit of the referenced data B2, sets "1" indicating "changed" to the change position display data E2[4], and initializes the reference frequency counter RC to "1".

In referring to the bits D2[5]-D2[7], the change bit monitoring portion 200 executes the processing flow FLW3. As a result, the count of the reference frequency counter RC assumes "4".

Since the change ("1"→"0") is detected between the bit D2[8] and the bit D2[9] directly adjoining the bit D2[8] in referring to the bit D2[8], the change bit monitoring portion 200 regards the bit D2[9] as the change bit of the referenced data B2, sets "1" indicating "changed" to the change position display data E2[8], and initializes the reference frequency counter RC to "1".

Thus, the change position display data E2 for the referenced data B2 is set with "10010001".

Figure 8A:
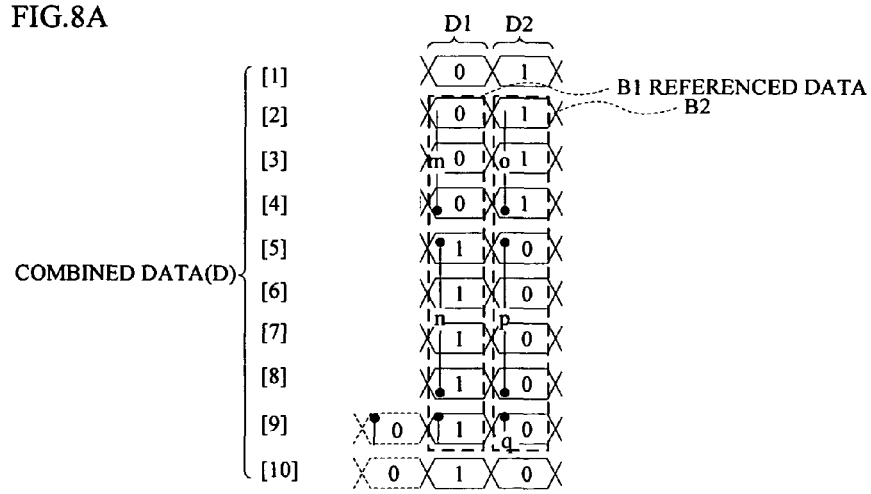
FIGS. 8A and 8B are diagrams showing a change bit monitoring example (4) of a change bit monitoring portion used for the present invention.
Figure 8B:
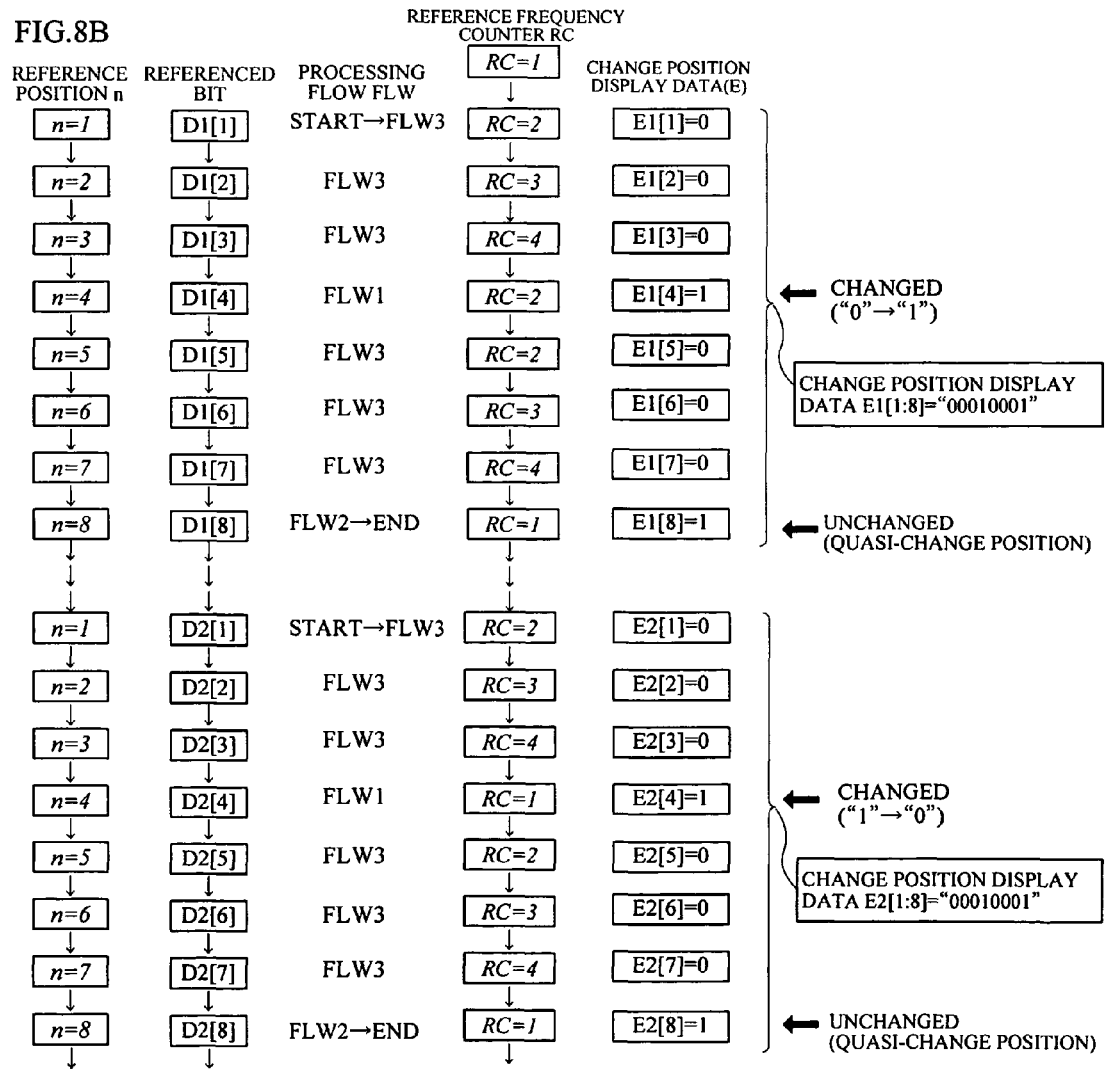

Change Bit Monitoring Example (4): FIGS. 8A and 8B

FIG. 8A shows an extracted part of combination data D1 and D2 concerning the data pattern PTN4 (data "m"-"p") where shifts occur in all of the data "m"-"p" under the influence of the jitters shown in the above-mentioned change bit monitoring examples (2) and (3) within the combination data (D) shown in FIG. 4B.

The change bit monitoring example for the combination data D1 and D2 will now be described referring to FIG. 8B. It is to be noted that the value of the reference frequency counter RC assumes "1" since the above-mentioned change bit monitoring (3) has been already executed.

When the combination data D1 is inputted, the change bit monitoring portion 200 executes the processing flow FLW3 in referring to bits D1[1]-D1[3]. As a result, the count of the reference frequency counter RC assumes "4".

Since the change ("0"→"1") is detected between the bit D1[4] and the bit D1[5] directly adjoining the bit D1[4] in referring to the bit D1[4], the change bit monitoring portion 200 regards the bit D1[5] as the change bit of the referenced data B1, sets "1" indicating "changed" to the change position display data E1[4], and initializes the reference frequency counter RC to "1".

In referring to the bits D1[5]-D1[7], the change bit monitoring portion 200 executes the processing flow FLW3. As a result, the count of the reference frequency counter RC assumes "4".

While no change is detected between the bit D1[8] and the D1[9] directly adjoining the bit D1[8] in referring to the bit D1[8], the reference frequency counter RC has reached the multiplication number "4" and no change is detected between the bit D1[9] and the bit D1[10] further adjoining the bit D1[9]. Therefore, the change bit monitoring portion 200 regards the bit D1[9] as a quasi-change position of the referenced data B1 as described in the above-mentioned processing flow FLW2, sets "1" indicating "changed" to the change position display data E1[8], and initializes the reference frequency counter RC to "1".

Thus, the change position display data E1 for the referenced data B1 is set with "00010001".

Also, when the combination data D2 is inputted, the change bit monitoring portion 200 executes the processing flow FLW3 in referring to the bits D2[1]-D2[3]. As a result, the count of the reference frequency counter RC assumes "4".

Since the change ("1"→"0") is detected between the bit D2[4] and the bit D2[5] directly adjoining the bit D2[4] in referring to the bit D2[4], the change bit monitoring portion 200 regards the bit D2[5] as the change bit of the referenced data B2, sets "1" indicating "changed" in the change position display data E2[4], and initializes the reference frequency counter RC to "1".

In referring to the bits D2[5]-D2[7], the change bit monitoring portion 200 executes the processing flow FLW3. As a result, the count of the reference frequency counter RC assumes "4".

While no change is detected between the bit D2[8] and the bit D2[9] directly adjoining the bit D2[8] in referring to the bit D2[8], the reference frequency counter RC has reached the multiplication number "4" and no change is detected between the bit D2[9] and the bit D2[10] further adjoining the bit D2[9]. Therefore, the change bit monitoring portion 200 regards the bit D2[9] as a quasi-change position of the referenced data B2, sets "1" indicating "changed" to the change position display data E2[8], and initializes the reference frequency counter RC to "1".

Thus, the change position display data E2 for the referenced data B2 is set with "00010001".

Figure 9A:
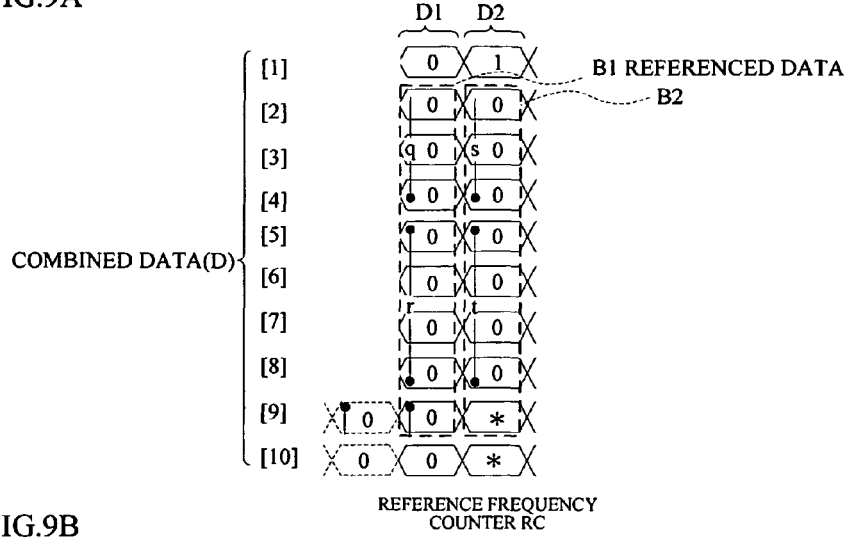
FIGS. 9A and 9B are diagrams showing a change bit monitoring example (5) of a change bit monitoring portion used for the present invention.
Figure 9B:
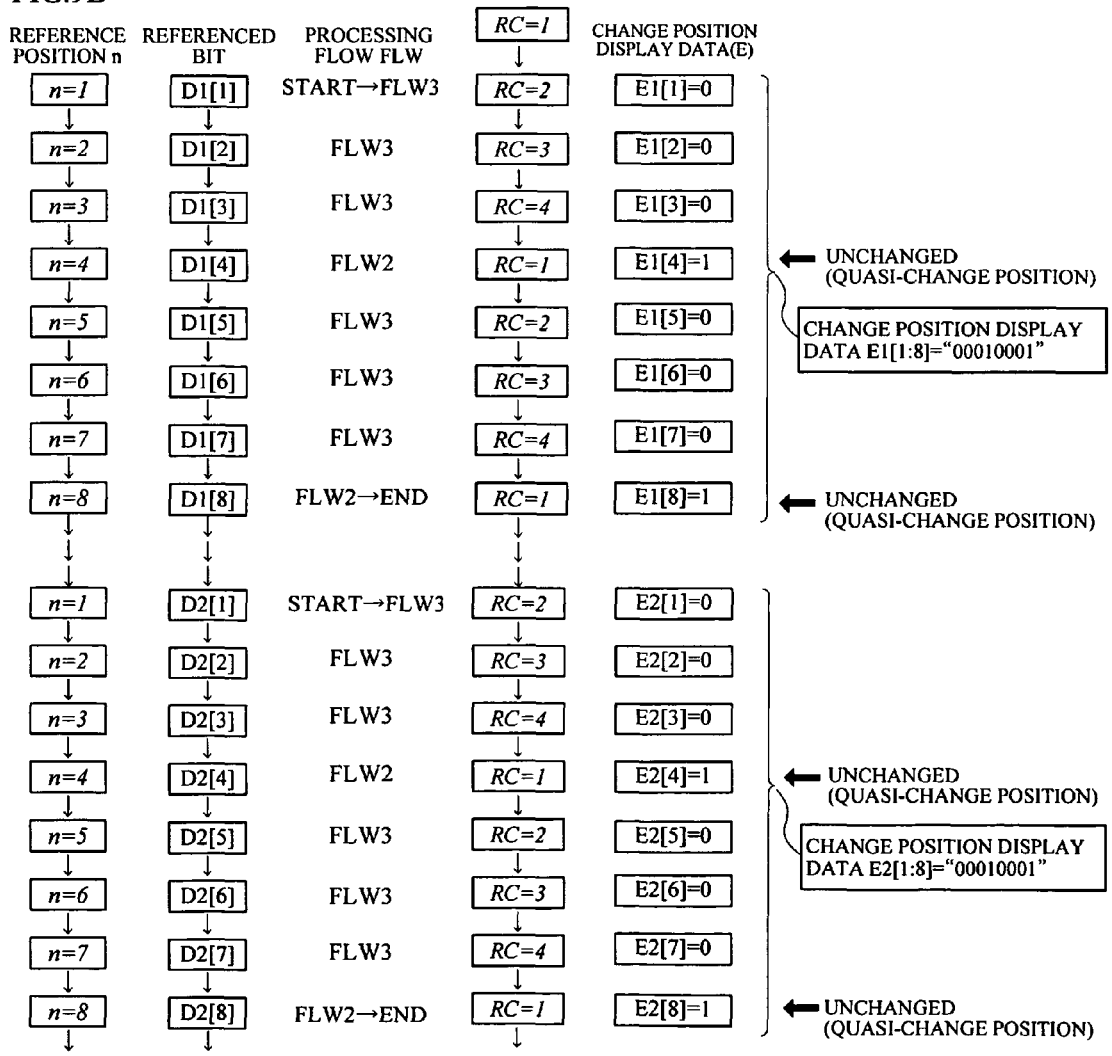

Change Bit Monitoring Example (5): FIGS. 9A and 9B

FIG. 9A shows an extracted part of combination data D1 and D2 concerning the data pattern PTN5 (data "q"-"t") where shifts occur in all of the data "q"-"t" under the influence of the jitters shown in the above-mentioned change bit monitoring examples (2) and (3), in the same way as the above-mentioned change bit monitoring example (4) within the combination data (D) shown in FIG. 4B.

The change bit monitoring example for the combination data D1 and D2 will now be described referring to FIG. 9B. It is to be noted that the count of the reference frequency counter RC assumes "1" since the above-mentioned change bit monitoring (4) has been already executed.

When the combination data D1 is inputted, the change bit monitoring portion 200 executes the processing flow FLW3 in referring to the bits D1[1]-D1[3]. As a result, the count of the reference frequency counter RC assumes "4".

While no change is detected between the bit D1[4] and the bit D1[5] in referring to the bit D1[4], the reference frequency counter RC has reached the multiplication number "4" and no change is detected between the bit D1[5] and the bit D1[6] further adjoining the bit D1[5]. Therefore, the change bit monitoring portion 200 regards the bit D1[5] as the quasi-change position of the referenced data B1 as described in the above-mentioned processing flow FLW2, sets "1" indicating "changed" in the change position display E1[4], and initializes the reference frequency counter RC to "1".

In referring to the bits D1[5]-D1[7], the change bit monitoring portion 200 executes the processing flow FLW3. As a result, the count of the reference frequency counter RC assumes "4".

While no change is detected between the bit D1[8] and the bit D1[9] directly adjoining the bit D1[8] in referring to the bit D1[8], the reference frequency counter RC has reached the multiplication number "4" and no change is detected between the bit D1[9] and the bit D1[10] further adjoining the bit D1[9]. Therefore, the change bit monitoring portion 200 regards the bit D1[9] as a quasi-change position of the referenced data B1, sets "1" indicating "changed" to the change position display data E1[8], and initializes the reference frequency counter RC to "1".

Thus, the change position display data E1 for the referenced data B1 is set with "00010001".

Also, when the combination data D2 is inputted, the change bit monitoring portion 200 executes the processing flow FLW3 in referring to the bits D2[1]-D2[3]. As a result, the count of the reference frequency counter RC assumes "4".

While no change is detected between the bit D2[4] and the bit D2[5] in referring to the bit D2[4], the reference frequency counter RC has reached the multiplication number "4" and no change is detected between the bit D2[5] and the bit D2[6] further adjoining the bit D2[5]. Therefore, the change bit monitoring portion 200 regards the bit D2[5] as the quasi-change position of the referenced data B2, sets "1" indicating "changed" to the change position display data E2[4], and initializes the reference frequency counter RC to "1".

In referring to the bits D2[5]-D2[7], the change bit monitoring portion 200 executes the processing flow FLW3. As a result, the count of the reference frequency counter RC assumes "4".

When the values of "*" of the bits D2[9] and [10] are "0" in referring to the bit D2[8], while no change is detected between the bit D2[8] and the bit D2[9] directly adjoining the bit D2[8], the reference frequency counter RC has reached the multiplication number "4" and no change is detected between the bit D2[9] and the bit D2[10] further adjoining the bit D2[9]. Therefore, the change bit monitoring portion 200 regards the bit D2[9] as a quasi-change portion of the referenced data B1, sets "1" indicating "changed" to the change position display data E2[8], and initializes the reference frequency counter RC to "1".

On the other hand, when the values of the bit D2[9] and [10] are "1", the change ("0"→"1") is detected between the bit D2[8] and the bit D2[9]. Therefore, the change bit monitoring portion 200 regards the bit D2[9] as the change bit of the referenced data B2 as described in the above-mentioned processing flow FLW1, sets "1" indicating "changed" to the change position display data E2[4], and initializes the reference frequency counter RC to "1".

Thus, the change position display data E2 for the referenced data B2 is set with "00010001".

Embodiment [2]

Figure 10:
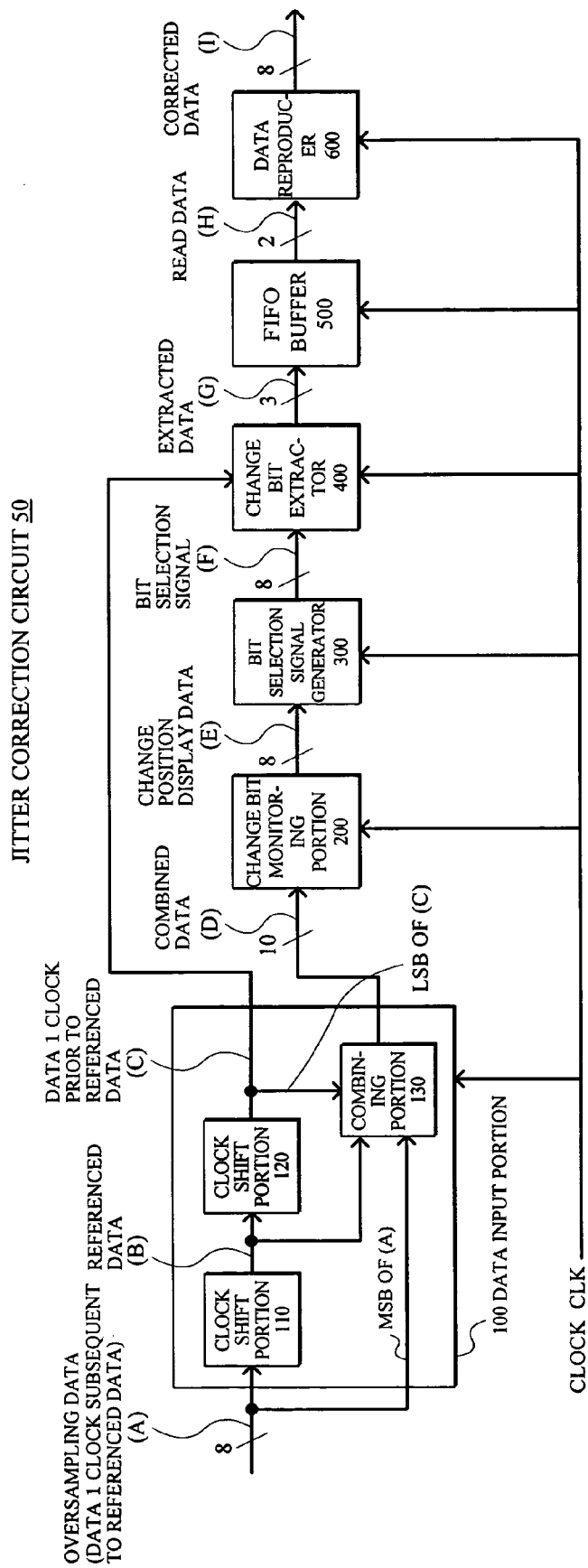
FIG. 10 is a block diagram showing an embodiment [2] of a jitter correction method and circuit according to the present invention.
Figure 11:
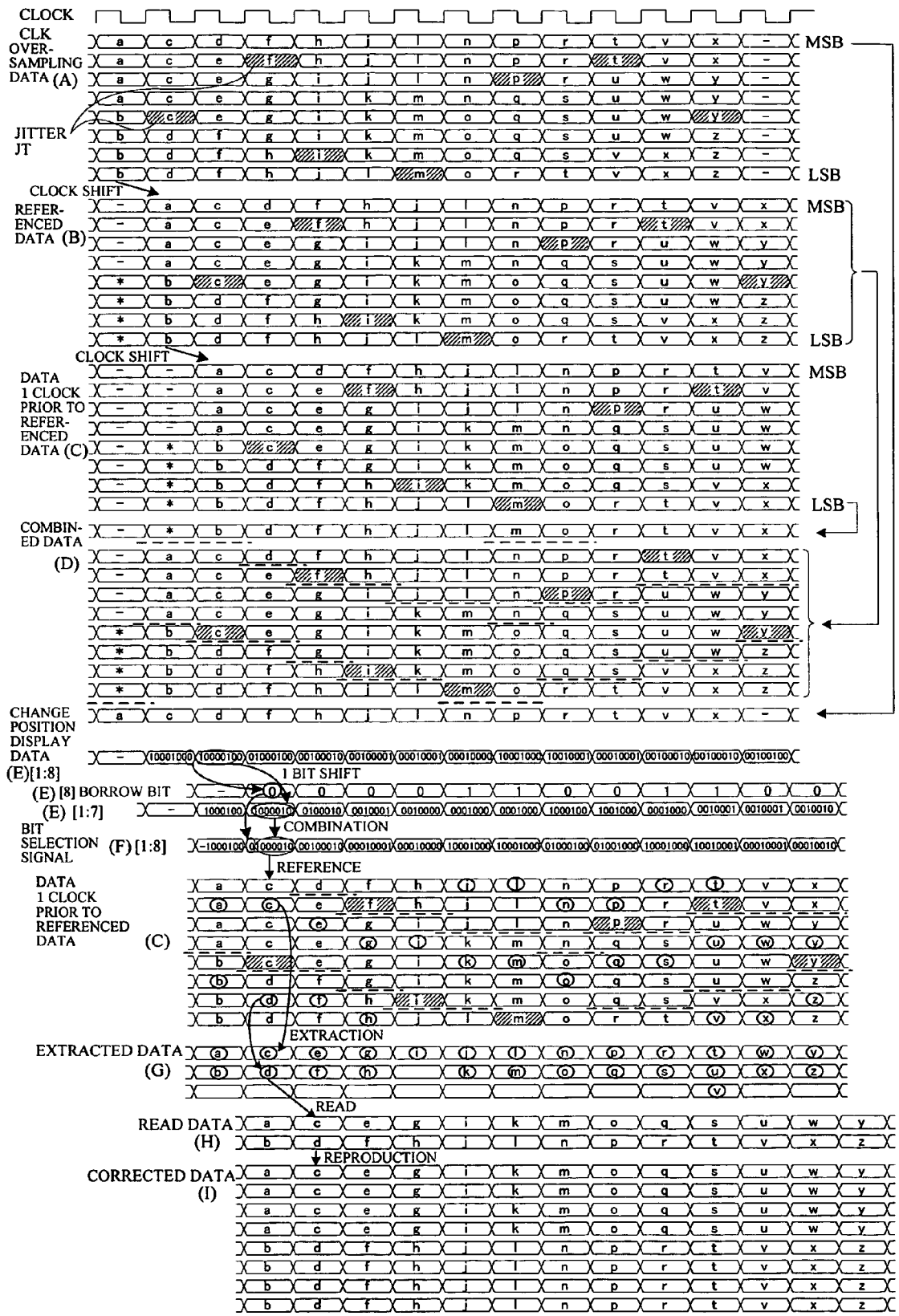
FIG. 11 is a time chart showing an overall operation example of an embodiment [2] of a jitter correction method and circuit according to the present invention.
Figure 12A:
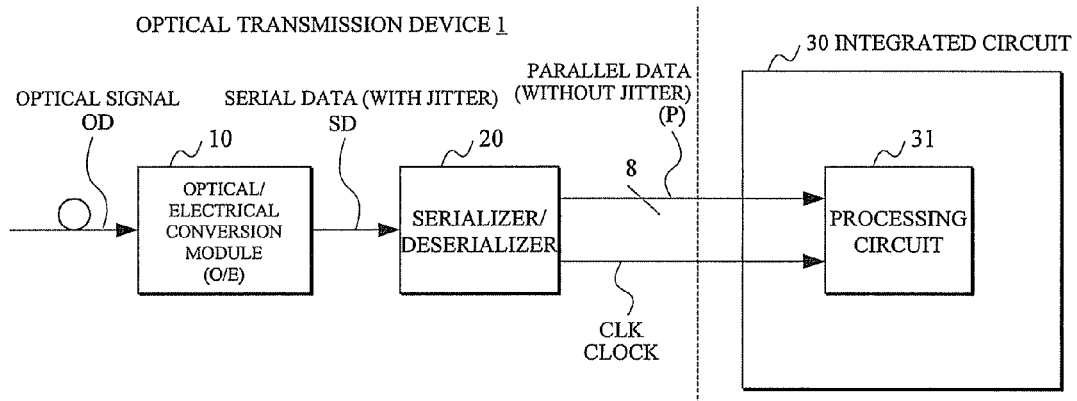
FIGS. 12A and 12B are block diagrams showing a prior art example of a jitter correction technology.
Figure 12B:
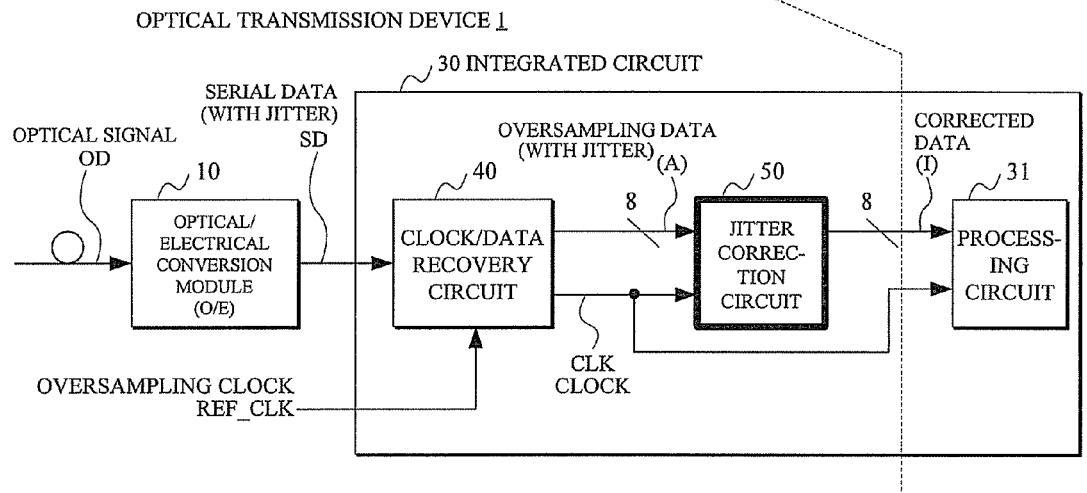
Figure 13:
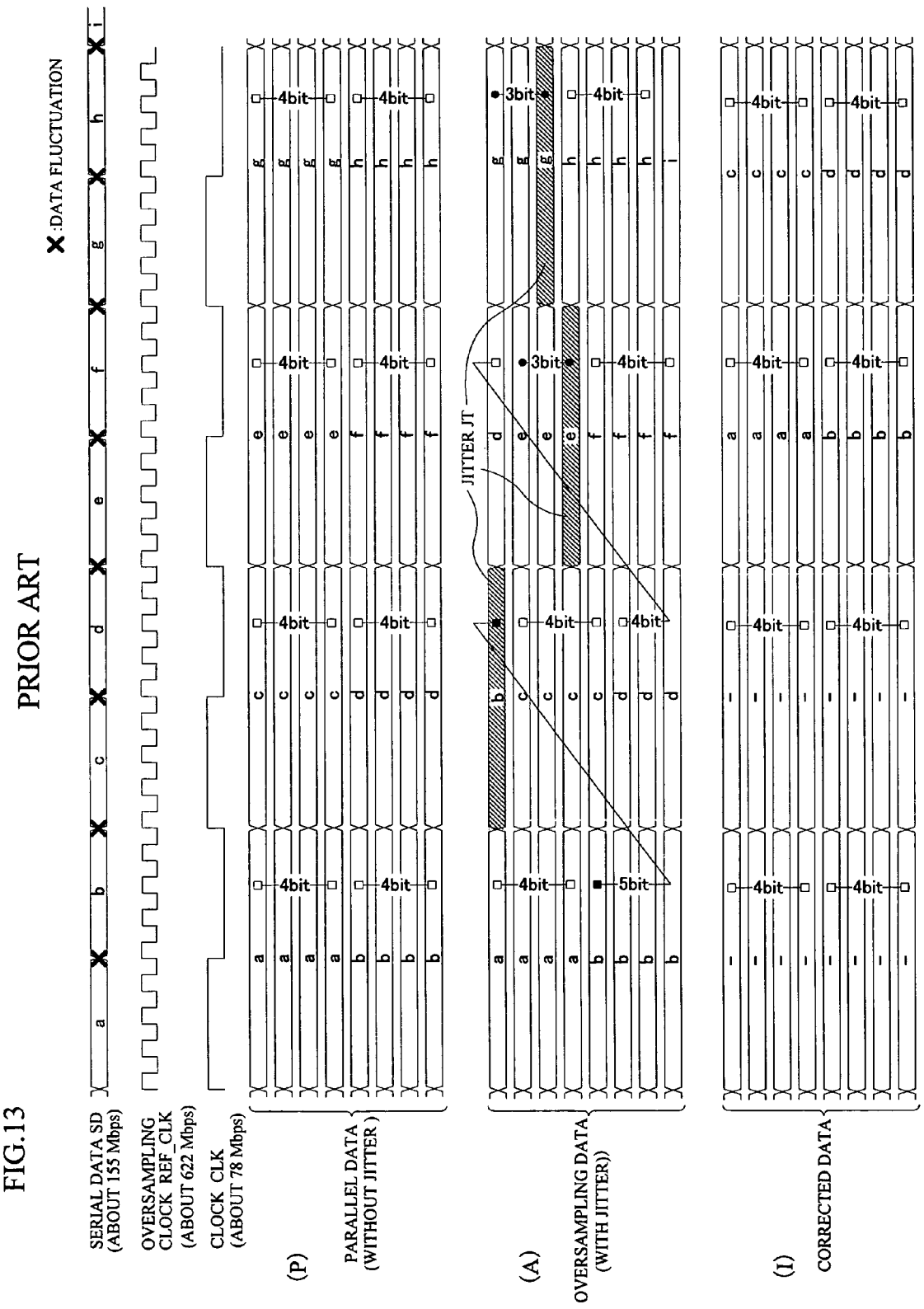
FIG. 13 is a time chart showing a prior art example of input/output data.

FIGS. 10 and 11

2-1 Arrangement: FIG. 10

The jitter correction circuit 50 shown in FIG. 10 comprises a bit selection signal generator 300 provided between the change bit monitoring portion 200 and the change bit extractor 400, generating a bit selection signal (F) from the change position display data (E) to be given to the change bit extractor 400, in addition to the arrangement of the above-mentioned embodiment [1].

Also, different from the above-mentioned embodiment [1], the data input portion 100 provides to the change bit extractor 400 not the referenced data (B) but data (C) 1 clock prior to the referenced data.

2-2 Operation Example

FIG. 11

Operation of this embodiment will now be described referring to FIG. 11.

The oversampling data (A) and jitters JT included in the data (A) in FIG. 11 are the same as those in the example shown in FIG. 2.

It is to be noted that the generation of the combination data (D), the generation of the change position display data (E), the read of the change bit from the FIFO buffer 500, and the reproduction of the corrected data (I) based on the read data (H) are the same as those in the above-mentioned embodiment [1]. Therefore, those descriptions are hereby omitted.

The bit selection signal generator 300 having received the change position display data (E) generated by the change bit monitoring portion 200 sequentially bit-shifts the change position display data (E), as shown in FIG. 11, e.g. in the direction of a lower bit by 1 bit.

The bit selection signal generator 300 combines a borrow bit (E)[8] (that is, LSB of change position display information corresponding to referenced data 1 clock prior to referenced data) occurring due to this bit shift, with the change position display data (E)[1:7] after the bit shift to generate the bit selection signal (F)[1:8] to be provided to the change bit extractor 400.

Since the bit selection signal (F) is delayed by 1 clock from the change position display data (E) due to the above-mentioned bit shift, as shown in FIG. 11, the data is outputted with the same clock of the data (C) 1 clock prior to the referenced data.

The change bit extractor 400 having received the bit selection signal (F) extracts all of the bits of the position in which "1" indicating "changed" is set from the data (C) 1 clock prior to the referenced data referring to the bit selection signal (F), and stores the extracted data (G) in the FIFO buffer 500. For example, when the bit selection signal (F) for the data (C) 1 clock prior to the referenced data including the data "c" and "d" is set with "01000100" as shown in FIG. 11, the change bit extractor 400 extracts the data "c" at the second bit and data "d" at the sixth bit.

Thus, it is made possible to extract a bit slightly influenced by the jitters (namely, a bit leaving from a bit influenced by jitters) from the changed bit detected by the above-mentioned embodiment [1], thereby performing the data reproduction.

It is to be noted that the present invention is not limited by the above-mentioned embodiments, and it is obvious that various modifications may be made by one skilled in the art based on the recitation of the claims.

What is claimed is:

1. A jitter correction method comprising:
   a first step of generating per clock cycle, combination data combined by adding, to referenced data within input data oversampled, an end bit of data one clock prior to and a head bit of data one clock subsequent to the referenced data and outputting the referenced data and the combination data;
   a second step of detecting a change between each bit referred to as a referenced bit of the combination data and a bit directly adjoining the referenced bit using a change bit monitoring circuit, initializing a number of reference times when the change is detected, incrementing the number of reference times when the change is not detected while the number of reference times does not reach a multiplication number of the oversampling, and generating change position display data in which the bit directly adjoining the referenced bit is regarded as a change bit of the referenced data when the number of reference times reaches the multiplication number of the oversampling and when no change between at least three adjoining bits including the referenced bit is detected; and
   a third step of extracting all the change bits from the referenced data by referring to the change position display data, and performing a data reproduction of the extracted change bits corresponding to the multiplication number,
   wherein the third step includes a step of storing the extracted change bits in a buffer per clock cycle, and reading per clock cycle, from the buffer the change bits stored by a bit number required for the data reproduction.

2. The jitter correction method as claimed in claim 1, wherein the first step includes a step of providing the data one clock prior to the referenced data to the third step,
   the jitter correction method further comprising a fourth step of generating a bit selection signal in which the change position display data generated at the second step is bit-shifted per clock cycle in a direction of a lower bit by a predetermined bit number to be provided to the third step, and
   the third step extracting all the change bits corresponding to the bit selection signal from the data one clock prior to the referenced data for the data reproduction.

3. A jitter correction circuit comprising:
   a first means for generating per clock cycle, combination data combined by adding, to referenced data within input data oversampled, an end bit of data one clock prior to and a head bit of data one clock subsequent to the referenced data and outputting the referenced data and the combination data;
   a second means for detecting a change between each bit referred to as a referenced bit of the combination data and a bit directly adjoining the referenced bit, initializing a number of reference times when the change is detected, incrementing the number of reference times when the change is not detected while the number of reference times does not reach a multiplication number of the oversampling and generating change position display data in which the bit directly adjoining the referenced bit is regarded as a change bit of the referenced data
   when the number of reference times reaches the multiplication number of the oversampling and when no change between at least three adjoining bits including the referenced bit is detected; and
   a third means for extracting all the change bits from the referenced data by referring to the change position display data, and for performing a data reproduction of the extracted change bits corresponding to the multiplication number,
   wherein the third means includes means for storing the extracted change bits in a buffer per clock cycle, and means for reading per clock cycle, from the buffer the change bits stored by a bit number required for the data reproduction.

4. The jitter correction circuit as claimed in claim 3, wherein the first means includes a means for providing the data one clock prior to the referenced data to the third means,
   the jitter correction circuit further comprising a fourth means for generating a bit selection signal in which the change position display data generated by the second means is bit-shifted once per clock cycle in a direction of a lower bit by a predetermined bit number to be provided to the third means, and
   the third means extracting all the change bits corresponding to the bit selection signal from the data one clock prior to the referenced data for the data reproduction.

5. A change bit monitoring method comprising:
   steps of detecting a change between each bit referred to as a referenced bit of a combination data, using a change bit monitoring circuit, combined by adding, to referenced data within input data oversampled, an end bit of data one clock prior to and a head bit of data one clock subsequent to the referenced data, and a bit directly adjoining the referenced bit, initializing a number of reference times when the change is detected, incrementing the number of reference times when the change is not detected while the number of reference times does not reach a multiplication number of the oversampling and generating change position display data in which the bit directly adjoining the referenced bit is regarded as a change bit of the referenced data
   when the number of reference times reaches the multiplication number of the oversampling and when no change between at least three adjoining bits including the referenced bit is detected.

6. A change bit monitoring circuit comprising:
   means for detecting a change between each bit referred to as a referenced bit of a combination data, combined by adding, to referenced data within input data oversampled, an end bit of data one clock prior to and a head bit of data one clock subsequent to the referenced data, and a bit directly adjoining the referenced bit, and
   means for initializing a number of reference times when the change is detected, incrementing the number of reference times when the change is not detected while the number of reference times does not reach a multiplication number of the oversampling and generating change position display data in which the bit directly adjoining the referenced bit is regarded as a change bit of the referenced data when the number of reference times reaches the multiplication number of the oversampling and when no change between at least three adjoining bits including the referenced bit is detected.

7. A jitter correction circuit comprising:

a circuit generating, per clock cycle, combination data combined by adding, to referenced data within input data oversampled, an end bit of data one clock prior to and a head bit of data one clock subsequent to the referenced data and outputting the referenced data and the combination data;

a circuit, detecting a change between each bit referred to as a referenced bit of the combination data and a bit directly adjoining the referenced bit, initializing a number of reference times when the change is detected, incrementing the number of reference times when the change is not detected awhile the number of reference times does not reach a multiplication number of the oversampling, and generating change position display data in which the bit directly adjoining the referenced bit is regarded as a change bit of the referenced data when the number of reference times reaches the multiplication number of the oversampling and when no change between at least three adjoining bits including the referenced bit is detected, and initializing a number of reference times when the change is detected; and a circuit extracting all the change bits from the referenced data by referring to the change position display data, and performing a data reproduction of the extracted change bits corresponding to the multiplication number, storing the extracted change bits in a buffer per clock cycle, and reading per clock cycle, from the buffer the change bits stored by a bit number required for the data reproduction.

* * * * *

UNITED STATES PATENT AND TRADEMARK OFFICE
CERTIFICATE OF CORRECTION

| | | |
|---|---|---|
| PATENT NO. | : 8,000,429 B2 | Page 1 of 1 |
| APPLICATION NO. | : 11/520609 | |
| DATED | : August 16, 2011 | |
| INVENTOR(S) | : Hideo Abe et al. | |

It is certified that error appears in the above-identified patent and that said Letters Patent is hereby corrected as shown below:

Column 19, Line 15, In claim 7, delete "detected awhile" and insert --detected while--, therefor.

Column 20, Line 7, In claim 7, delete "detected; and" and insert --detected, and--, therefor.

Signed and Sealed this
Twenty-fifth Day of October, 2011

David J. Kappos
*Director of the United States Patent and Trademark Office*